US012802512B2

(12) United States Patent
Yamada

(10) Patent No.: US 12,802,512 B2
(45) Date of Patent: Nov. 17, 2026

(54) PRODUCT PROVISION DEVICE

(71) Applicant: SEGA CORPORATION, Tokyo (JP)

(72) Inventor: Atsuhiro Yamada, Tokyo (JP)

(73) Assignee: SEGA CORPORATION, Tokyo (JP)

(*) Notice: Subject to any disclaimer, the term of this patent is extended or adjusted under 35 U.S.C. 154(b) by 170 days.

(21) Appl. No.: 18/790,133

(22) Filed: Jul. 31, 2024

(65) Prior Publication Data

US 2024/0386771 A1 Nov. 21, 2024

Related U.S. Application Data

(63) Continuation of application No. PCT/JP2023/001979, filed on Jan. 23, 2023.

(30) Foreign Application Priority Data

Feb. 1, 2022 (JP) ................................ 2022-013976

(51) Int. Cl.
*G07F 11/68* (2006.01)
*B65H 16/00* (2006.01)
*B65H 35/06* (2006.01)

(52) U.S. Cl.
CPC .......... *G07F 11/68* (2013.01); *B65H 16/005* (2013.01); *B65H 35/06* (2013.01); *B65H 2220/03* (2013.01); *B65H 2701/194* (2013.01)

(58) Field of Classification Search
CPC . G07F 11/68; G07F 5/02; G07F 9/023; G07F 9/026; G07F 11/58; G07F 9/02; B65H 16/005; B65H 35/06; B65H 2220/03; B65H 2701/194; B65H 35/0066; B65H 35/0093; G06Q 20/18; G06Q 20/209
See application file for complete search history.

(56) References Cited

U.S. PATENT DOCUMENTS

2012/0034964 A1* 2/2012 Luciano, Jr. .......... G07F 17/326 463/17
2021/0186275 A1* 6/2021 Rueckheim ............ A47K 10/36

FOREIGN PATENT DOCUMENTS

JP S51124996 A 10/1976
JP 3177207 U 7/2012

OTHER PUBLICATIONS

Kracie Foods, "Chupa Chups," (online), Internet URL: https://www.chupachups.jp/products/vending-machine (2 pages).

(Continued)

*Primary Examiner* — Jacob S. Scott
*Assistant Examiner* — Miraj T. Patel
(74) *Attorney, Agent, or Firm* — Osha Bergman Watanabe & Burton LLP

(57) ABSTRACT

The product provision device includes: a discharge port that discharges products; a dispensing port from which a user takes the products discharged from the discharge port; a central processing unit (CPU) that determines a provision quantity of the products; a conveyor that comprises a roller and conveys, among a plurality of product units connected in a continuous state in a product group, a product unit of the provision quantity such that the product unit of the provision quantity is discharged from the discharge port in a continuous state; and a product presentation guide that is disposed along a path from the discharge port to the dispensing port, and presents, as a product to be provided to the user, the product unit of the provision quantity discharged from the discharge port in the continuous state.

7 Claims, 7 Drawing Sheets

(56) References Cited

OTHER PUBLICATIONS

International Search Report issued in corresponding International Application No. PCT/JP2023/001979 mailed Mar. 20, 2023 (5 pages).
Written Opinion issued in corresponding International Application No. PCT/JP2023/001979 mailed Mar. 20, 2023 (3 pages).
Office Action issued in corresponding Japanese Patent Application No. 2022-013976 mailed on Aug. 26, 2025 (8 pages).

* cited by examiner

PRODUCT PROVISION DEVICE

BACKGROUND

Technical Field

The present invention relates to a product provision device.

Description of Related Art

There are known product provision devices that provide a user with products whose provision quantities are randomly determined (see Non-Patent Literature 1, for example).

NON-PATENT LITERATURE

Non-Patent Literature 1: Kracie Foods, "Chupa Chups," (online) (search conducted on Dec. 1, 2021), Internet URL: https://www.chupachups.jp/products/vending-machine

Technological Problem to be Solved by the Invention

With a product provision device such as this, even though a provision quantity of the products (a quantity of the products to be provided to the user at a time) has been randomly determined, the product provision device does not have any means for presenting the provision quantity in a way that allows the user to visually recognize the provision quantity before the products are discharged to a dispensing port, which makes it difficult for the user to have a sense of how much the provision quantity has increased until actually having the products in hand.

The present invention was conceived in light of the above technological problem, and provides means for presenting the provision quantity in a way that allows the user to visually recognize the provision quantity before the products are discharged to a dispensing port, which makes it easier for a user to have a sense of an increase in quantity.

SUMMARY

A product provision device of one aspect of the present invention comprises:

- a discharge port that discharges products;
- a dispensing port from which a user takes the products discharged from the discharge port;
- a central processing unit (CPU) that determines a provision quantity of the products;
- a conveyor that conveys, among a plurality of product units connected in a continuous state in a product group, a product unit of the provision quantity such that the product unit of the provision quantity is discharged from the discharge port in a continuous state; and
- a product presentation guide that: is disposed along a path from the discharge port to the dispensing port, and presents, as a product to be provided to the user, the product unit of the provision quantity discharged from the discharge port in the continuous state.

Other features of the present invention will become apparent from the description in the specification and the appended drawings.

BRIEF DESCRIPTION OF THE DRAWINGS

FIG. 4A is a diagram illustrating a product group, FIG. 4B is a diagram illustrating a sticker front surface, and FIG. 4C is a diagram illustrating a sticker rear surface;

FIG. 7A is a diagram showing a sticker disposed in one section of a sticker backing, FIG. 7B is a diagram showing an example of a sticker disposed such that it spans multiple sections of a sticker backing, and FIG. 7C is a diagram showing another example of a sticker disposed such that it spans multiple sections of a sticker backing.

DETAILED DESCRIPTION

Figure 1:
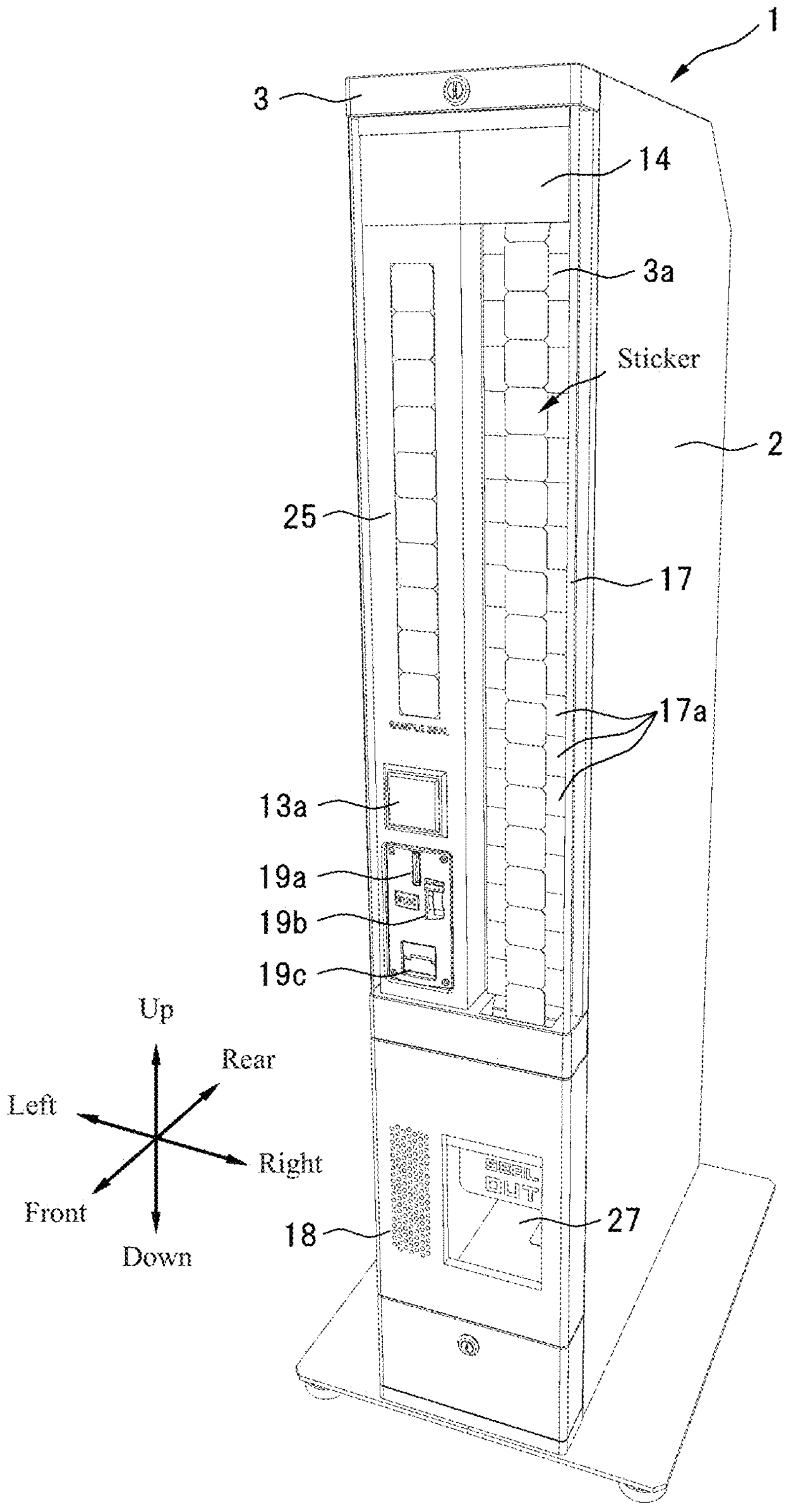
FIG. 1 is a schematic diagram showing the configuration of a vending machine 1 according to one or more embodiments of the present invention.

At least the following matters will become apparent from the description in this specification and the appended drawings.

A product provision device comprises:

- a discharge port that discharges products;
- a dispensing port from which a user takes the products discharged from the discharge port;
- a central processing unit (CPU) that determines a provision quantity of the products;
- a conveyor that comprises a roller and conveys, among a plurality of product units connected in a continuous state in a product group, a product unit of the provision quantity such that the product unit of the provision quantity is discharged from the discharge port in a continuous state; and
- a product presentation guide that: is disposed along a path from the discharge port to the dispensing port, and presents, as a product to be provided to the user, the product unit of the provision quantity discharged from the discharge port in the continuous state.

With a product provision device such as this, when the provision quantity is determined, the product unit of the provision quantity are presented in a continuous state as the product to be provided to the user, so the user can easily have a sense of an increase in quantity, and have a sense of a large, continuous quantity without actually having the products in hand.

Also, in this product provision device,

- a separator may be provided that separates, from the product group, the product unit of the provision quantity that has been presented as the product to be provided to the user.

With a product provision device such as this, the product unit of the provision quantity that has been presented as the product is separated from the product group, making it easier to remove the product from the dispensing port.

Also, in this product provision device,

- the product presentation guide may comprise a light-emitting panel that emits light to the product unit of the provision quantity that has been presented as the product to be provided to the user.

With a product provision device such as this, light is shined on the product unit of the provision quantity that has been presented as the product, making those products stand out, and this heightens the excitement on the part of the user.

Also, in this product provision device, the CPU may control the light-emitting panel to emit light in matching with movement of the product unit of the provision quantity that is sequentially discharged in the continuous state from the discharge port toward the dispensing port.

With a product provision device such as this, light is shined on the product unit of the provision quantity that has been presented as the product as it moves from the discharge port to the dispensing port, and the movement of the product and the movement of the light are interlinked, making it easier to have a sense of an increase in quantity, and to have a sense of a large, continuous quantity.

Also, in this product provision device, the CPU may determine the provision quantity according to how many of the product units included in the product group still remain.

With a product provision device such as this, it is possible to dispense all of the product units included in the product group.

Also, in this product provision device, the product group may include a first product unit disposed corresponding to one section of the product group and a second product unit disposed corresponding to a plurality of sections of the product group, the first and second product units connecting to each other in a continuous state, he product provision device further comprises: a product detector that detects the first product unit or the second product unit, and in response to the product detector detecting the second product unit, the conveyor may convey the product unit of the provision quantity by a conveyance different from a conveyance amount in a case of detecting the first product unit.

With a product provision device such as this, even when a product group includes the second product unit disposed in association with a plurality of sections, the second product unit can be appropriately conveyed.

Also, in this product provision device, the CPU may randomly determine the provision quantity before receiving a user operation to request a product, and the conveyor may convey the product unit of the provision quantity after receiving the user operation.

With a product provision device such as this, the provision quantity can be determined before the user performs an operation, so preparations for providing products to the user can be made sooner.

EMBODIMENTS

In this embodiment, a vending machine that vends stickers (an example of a product) to a user will be described in specific terms as an example of a product provision device that provides products to users.

Configuration of Vending Machine 1

Overall Configuration

Figure 2:
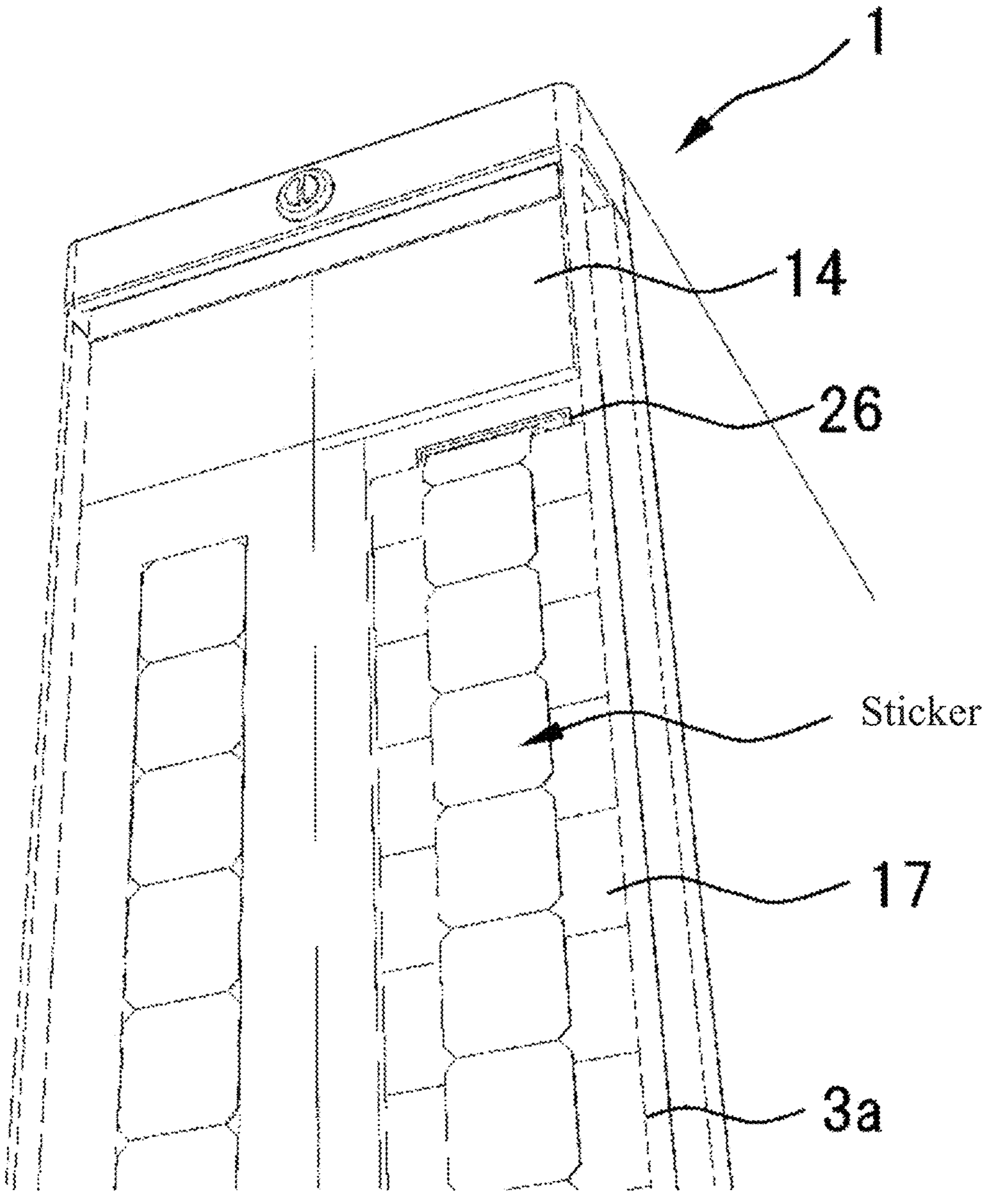
FIG. 2 is a schematic diagram showing the configuration of the area around a discharge port 26 of the vending machine 1 according to this embodiment.
Figure 3:
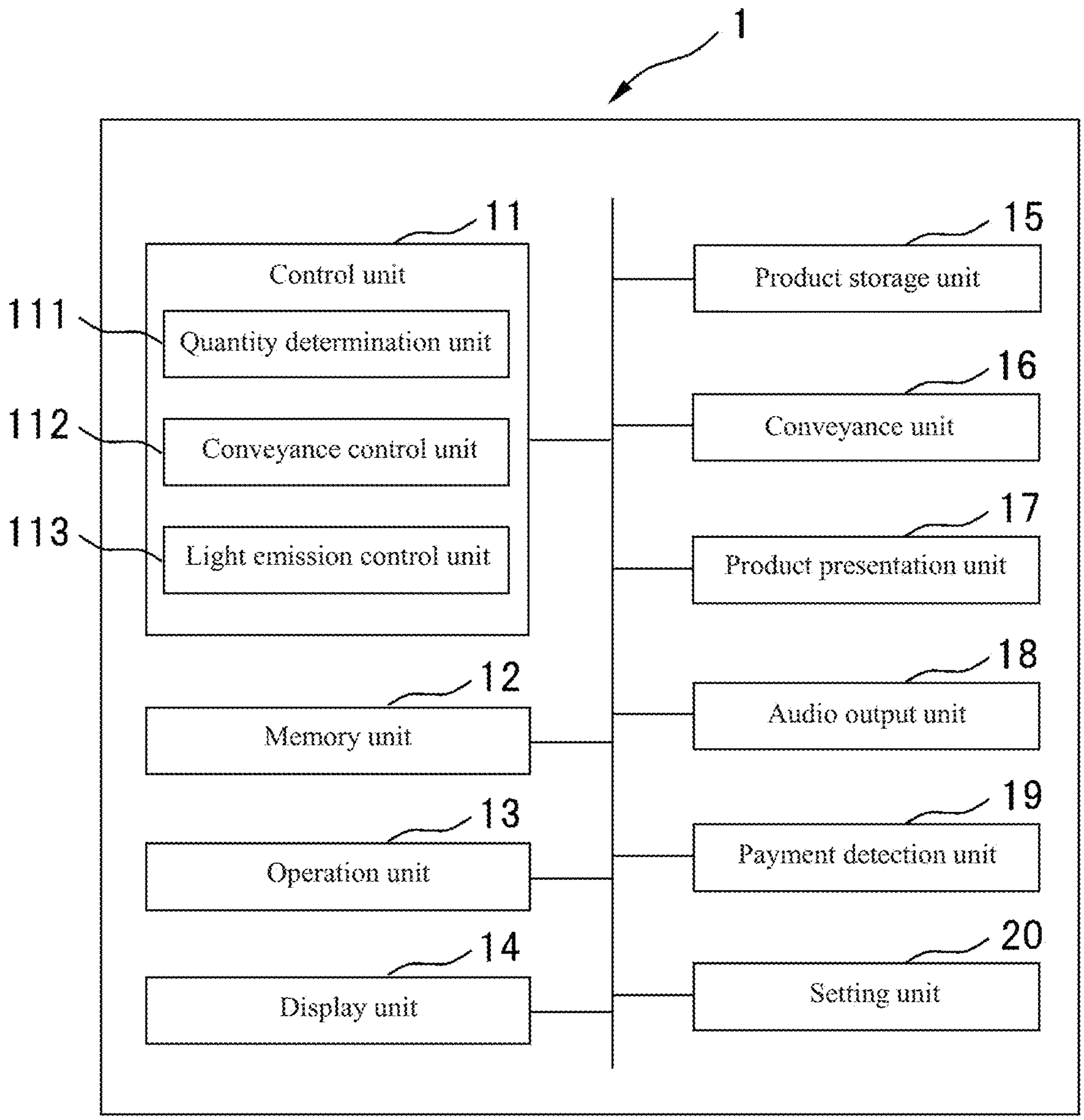
FIG. 3 is a block diagram showing the configuration of the vending machine 1 according to this embodiment.

An example of the configuration of a vending machine 1 according to this embodiment will be described with reference to FIGS. 1 to 3. FIG. 1 is a schematic diagram showing the configuration of a vending machine 1 according to one or more embodiments of the present invention. FIG. 2 is a schematic diagram showing the configuration of the area around a discharge port 26 of the vending machine 1 according to this embodiment. FIG. 3 is a block diagram showing the configuration of the vending machine 1 according to this embodiment.

In the following description, the directions are defined as shown in FIG. 1. That is, the vertical direction is defined as the "up and down direction," and "up" and "down" are defined according to gravity. Also, the "front and rear direction" is defined in terms of viewing from the user side facing the vending machine 1, with the near side being the "front" and the far side being the "rear." Also, the direction perpendicular to the up and down direction and the front and rear direction is the "left and right direction," with "right" and "left" defined in terms of viewing from the user side.

The vending machine 1 in this embodiment is a sticker vending machine that is installed in a shop (such as a home appliance store, a restaurant, etc.) or a facility (such as a shopping facility, an amusement facility, etc.) and vends stickers in exchange for payment from the user. In this embodiment, when a user pays a fee, the number of stickers to be provided is randomly determined from a specific range, and the stickers in the determined provision quantity are sold as products. Accordingly, the number of stickers that a user is able to purchase with a single payment is not fixed to a minimum number, which allows the user to enjoy the feeling of getting more stickers.

As shown in FIGS. 1 to 3, the vending machine 1 in this embodiment has a vending machine main body 2, a door body 3, a control unit 11, a memory unit 12, an operation unit 13, a display unit 14, a product storage unit 15, a conveyance unit (or conveyor) 16, a product presentation unit (or production presentation guide) 17, an audio output unit 18, a payment detection unit 19, a setting unit 20, a product sample presentation unit 25, a discharge port 26, a dispensing port 27, etc.

As shown in FIG. 1, the door body 3 is provided on the front side of the main body 2 so as to be capable of opening and closing. In this embodiment, the left end of the door body 3 is coupled to the main body 2 via a rotating shaft (not shown) that extends in the up and down direction, which allows the door body 3 to be opened and closed by rotating around this shaft.

The door body 3 in this embodiment is provided with the product sample presentation unit 25, the operation unit 13, the payment detection unit 19, the display unit 14, a transparent part 3*a*, the audio output unit 18, and the dispensing port 27.

The product sample presentation unit 25 is provided on the left side of the front of the door body 3, and is configured to be able to present multiple types of sticker samples (product samples). As shown in FIG. 1, the product sample presentation unit 25 in this embodiment presents multiple types of sticker samples arranged in the up and down direction.

The operation unit 13 is provided under the product sample presentation unit 25 and is used by the user to purchase products. As shown in FIG. 1, the operation unit 13 in this embodiment is an operation button 13*a* provided on the left side of the front of the door body 3.

The payment detection unit 19 is provided under the operation button 13*a* and serves to detect a payment made by a user. The payment detection unit 19 in this embodiment has a coin insertion slot 19*a*, a return lever 19*b*, a return slot 19*c*, a coin detector (not shown), a coin passage path (not shown), and a coin box (not shown).

In this embodiment, when a user inserts a coin into the coin insertion slot 19*a*, the inserted coin is detected by the coin detector. The coin detector is, for example, an optical sensor, and detects the presence of an inserted coin by means of a light-emitting element and a light receiving element that are attached along the coin passage path. Coins that have passed through the coin passage path are stored in the coin box.

As shown in FIG. 1, the display unit 14 is provided on the upper right side of the front of the door body 3, and displays various kinds of information on a display. The display unit 14 in this embodiment is configured to be able to display a randomly determined provision quantity, and may be, for example, a seven-segment display, a liquid crystal display (LCD), or the like. The configuration may also be such that an instruction screen for purchasing products, a product advertisement screen, an error screen indicating that all of a certain type of sticker have been discharged and that sticker is out of stock, or other such screen is displayed based on a command from the control unit 11.

The transparent part 3*a* is formed from a transparent material (such as acrylic resin, polycarbonate resin, or glass) and is provided on at least the front side of the door body 3 so that the product sample presentation unit 25 and the product presentation unit 17 can be viewed from the outside.

The audio output unit 18 is provided on the lower left side of the front of the door body 3, and uses a digital amplifier or the like to amplify audio signals (audio information) outputted from the control unit 11, such as voice, sound effects, or warning sounds, and outputs this audio. For example, the audio output unit is a speaker or the like.

As shown in FIG. 1, the dispensing port 27 is provided on the lower right side of the front of the door body 3, and is used by the user to remove the stickers in the randomly determined provision quantity. In this embodiment, the stickers in the randomly determined provision quantity are separated from the product group (hereinafter also referred to as a sticker group) and then drop from the discharge port 26 (see FIG. 2). Accordingly, the user can remove from the dispensing port 27 the stickers that have dropped while they are still in a continuous state.

The main body 2 in this embodiment is provided with the control unit 11, the memory unit 12, the product storage unit 15, the conveyance unit 16, the product presentation unit 17, the setting unit 20, and the discharge port 26.

The control unit 11 is used to control the entire vending machine 1, and is a CPU (central processing unit) that executes a program stored in a specific memory.

The control unit 11 in this embodiment has at least a quantity determination unit 111, a conveyance control unit 112, a light emission control unit 113, etc.

The function of the quantity determination unit 111 is to execute processing to randomly determine a provision quantity.

In this embodiment, when the user makes a payment, the quantity determination unit 111 randomly determines a sticker provision quantity from within a specific range (a range from a specific lower limit number to a specific upper limit number).

The function of the conveyance control unit 112 is to execute processing to convey stickers. In this embodiment, the conveyance control unit 112 controls the conveyance unit 16 so that, for example, the stickers in the provision quantity determined by the quantity determination unit 111

(from among the sticker group) move from the discharge port 26 toward the dispensing port 27.

The function of the light emission control unit 113 is to execute processing to shine light on the product presentation unit 17. In this embodiment, the light emission control unit 113 controls the light shined on the product presentation unit 17 according to the movement of the stickers in the provision quantity determined by the quantity determination unit 111 toward the dispensing port 27 as the stickers are discharged one after the other from the discharge port 26 in a continuous state.

The memory unit 12 has a ROM (read-only memory), which is a read-only memory area in which various programs and information required by the vending machine 1 are stored, and a RAM (random access memory), which is a rewritable memory area used as a work area for calculation processing performed by the control unit 11, and is realized by a non-volatile storage device such as a flash memory or a hard disk. The storage unit 12 in this embodiment stores operating status and setting information set during operation. An example of the operating status is when the initial quantity of stickers included in the initially set unused sticker group is stored. Every time stickers are discharged, the remaining quantity, obtained by subtracting the provision quantity determined by the quantity determination unit 111 from the initial quantity, may be stored.

The product storage unit 15 is for storing, in the main body 2, a product group in which a plurality of product units are connected in a continuous state. In this embodiment, one sticker is set as a product unit, and a product group (sticker group) is formed by winding into a roll a plurality of stickers that are connected in series. Therefore, the product storage unit 15 in this embodiment can rotatably support a product group (sticker group) in the form of a roll.

The conveyance unit 16 is provided inside the main body 2 and conveys the stickers from the upstream side to the downstream side in a specific direction in which the stickers are conveyed (hereinafter referred to as the conveyance direction). The conveyance unit 16 in this embodiment conveys, for example, the stickers in the randomly determined provision quantity (from among the sticker group) along the conveyance direction so that the stickers are discharged in a continuous state from the discharge port 26.

The product presentation unit 17 presents products to be provided to users who have paid for them, on the front side of the vending machine 1.

As shown in FIGS. 1 and 2, the product presentation unit 17 in this embodiment is visible from the outside through the transparent part 3*a* of the door body 3, so the stickers in the provision quantity that have been discharged in a continuous state from the discharge port 26 can be presented as the products to be provided to the user.

Also, the product presentation unit 17 is provided on a path along which the provision quantity of stickers discharged in a continuous state from the discharge port 26 head toward the dispensing port 27, and also functions as a guide that guides these stickers from the discharge port 26 to the dispensing port 27.

As shown in FIG. 1, the product presentation unit 17 has light-emitting panels 17*a*, which are an example of light-emitting units, arranged in the up and down direction. Each of the light-emitting panels 17*a* is provided with a light source such as an LED, and emits light to the rear surface of the sticker.

The setting unit 20 is used by the seller when performing setting operations. The setting unit 20 in this embodiment has a setting operation unit (not shown) and a setting display unit (not shown). In this embodiment, the seller can set the price for one play in advance by operating the setting operation unit while looking at the setting display unit. When the price for one play is set, the range of the sticker provision quantity (a range from the lower limit to the upper limit) is also set at the same time.

For example, in a case in which the price for one play can be set in three levels of "100 yen," "200 yen," and "300 yen," then when the price for one play is set to "100 yen," the range of the sticker provision quantity will be set to "a range from a lower limit of 5 stickers to an upper limit of 15 stickers"; when the price for one play is set to "200 yen," the range of the sticker provision quantity will be set to "a range from a lower limit of 10 stickers to an upper limit of 30 stickers"; and when the price for one play is set to "300 yen," the range of the sticker provision quantity will be set to "a range from a lower limit of 15 stickers to an upper limit of 45 stickers."

As shown in FIGS. 1 and 2, the discharge port 26 is provided on the upper right side of the front of the main body 2, behind the display unit 14 of the door body 3, and is used to discharge the randomly determined number of stickers from the product storage unit 15 to the product presentation unit 17. In this embodiment, stickers in the randomly determined provision quantity (from among the sticker group) are discharged one after the other from the discharge port 26 by the conveyance unit 16 in a continuous state.

Product Group

Figure 4A:
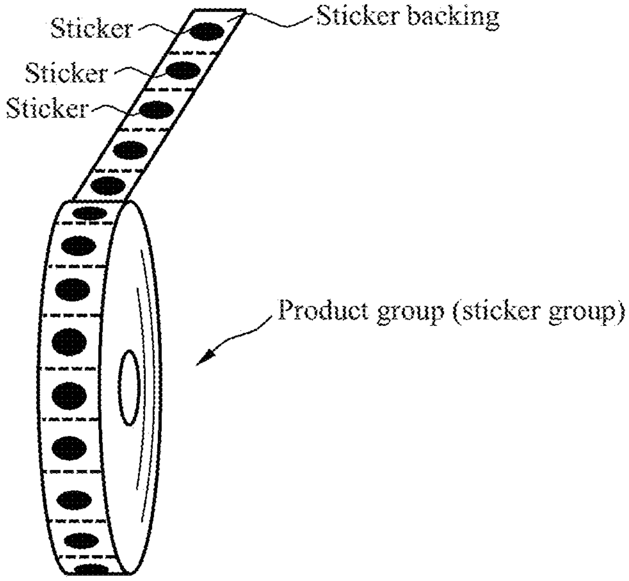
FIGS. 4A-4C are diagrams illustrating the configuration of a product group according to this embodiment, where
Figure 4B:
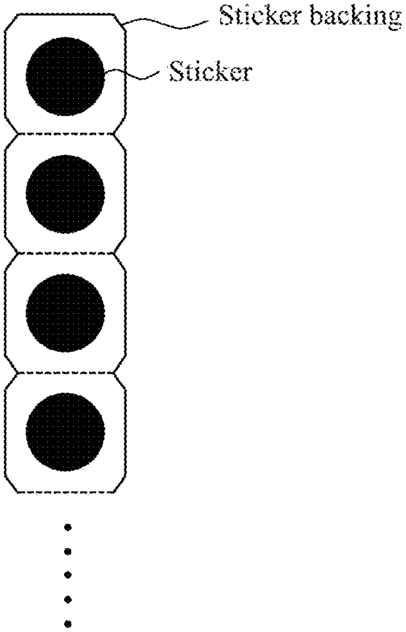
Figure 4C:
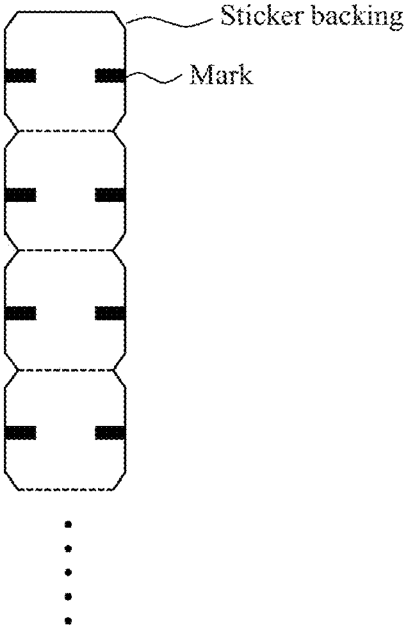

The configuration of a product group according to this embodiment will be described with reference to FIGS. 4A-4C. FIGS. 4A-4C are diagrams illustrating the configuration of a product group according to this embodiment, where FIG. 4A is a diagram illustrating a product group, FIG. 4B is a diagram illustrating a sticker front surface, and FIG. 4B is a diagram illustrating a sticker rear surface.

A product group consists of a plurality of product units that are connected together in a continuous state. The product group in this embodiment is sticker group in which a plurality of single stickers (product units) are connected together into a continuous state. More specifically, as shown in FIG. 4A, this is a sticker roll produced by winding a continuous strip of sticker backing, on which stickers are affixed at equal intervals, around a core material in a roll shape.

As shown in FIG. 4B, stickers with designs printed on their front surface are arranged on the strip of sticker backing at equal intervals in the direction in which the strip of sticker backing is continuous. The sticker backing is configured such that notches are provided at both ends at the boundary positions, and perforations, creases, or the like are provided at the boundary positions to make it easy to separate one section of the sticker backing corresponding to one sticker at a time.

Stickers with a plurality of preprinted designs are prepared in advance. In this embodiment, in a sticker roll, the stickers are arranged so that adjacent stickers connected together will have different designs. Therefore, even though stickers are provided in a randomly determined provision quantity, the types of stickers are unlikely to be duplicative, which enhances user satisfaction.

As shown in FIG. 4C, on the rear surface of each sticker, a mark that is used as a reference when conveying the sticker roll is printed in advance on each section of the sticker backing. In this embodiment, the mark is printed on the rear surface of each sticker (the rear surface of the sticker backing) so as to correspond to the position of the printed design on the front surface of the sticker. Stickers in the randomly determined provision quantity can be counted and it can be confirmed whether that provision quantity of stickers is being conveyed toward the discharge port 26 by detecting this mark with a sensor.

Conveyance Unit

Figure 5:
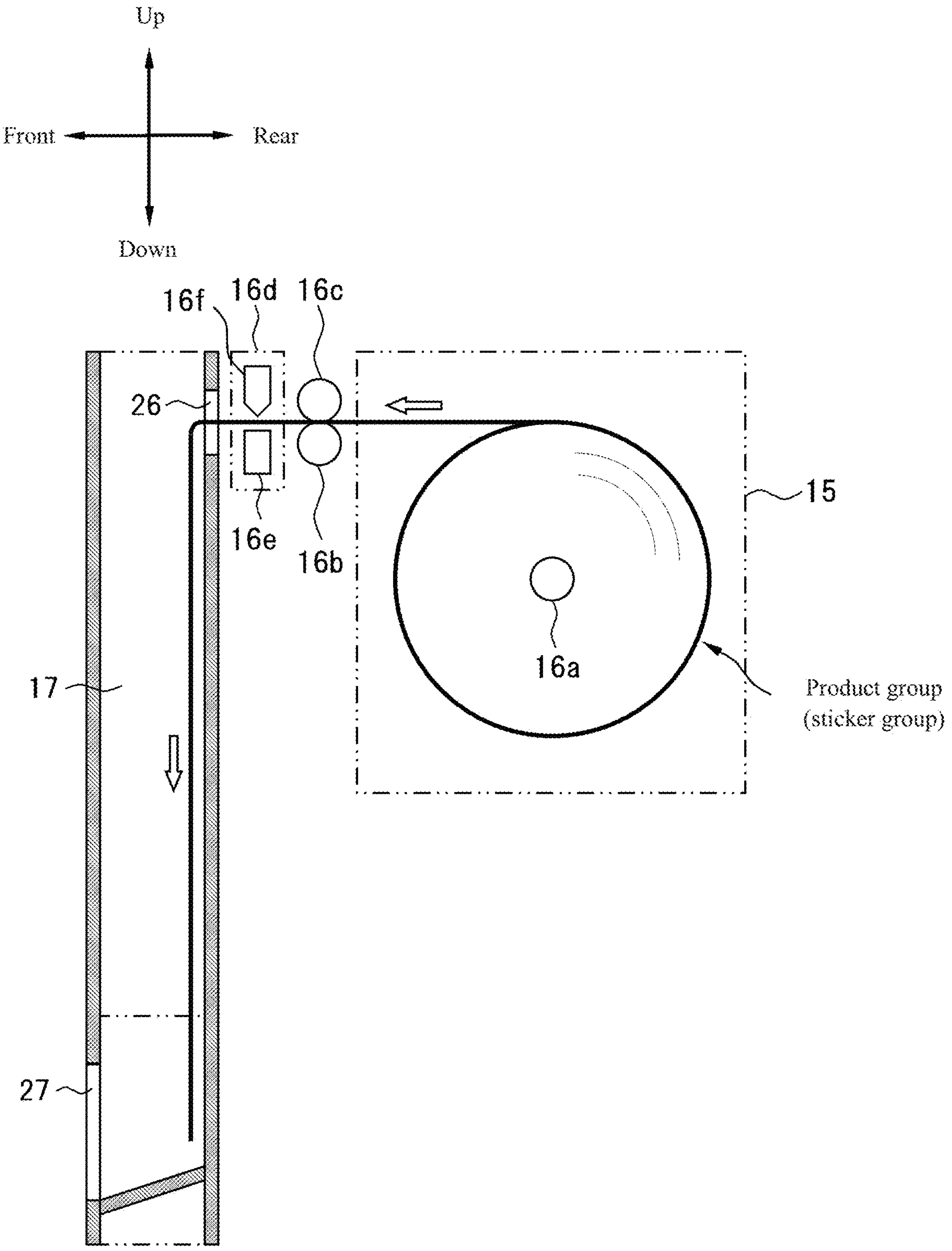
FIG. 5 is a schematic diagram showing the configuration of a conveyance unit (or conveyor) 16 according to this embodiment.

The configuration of the conveyance unit 16 according to this embodiment will be described with reference to FIG. 5. FIG. 5 is a schematic diagram showing the configuration of the conveyance unit 16 according to this embodiment.

As shown in FIG. 5, the conveyance unit 16 in this embodiment has a feed roller 16*a*, a conveyance roller 16*b*, a driven roller 16*c*, a separation unit (or separator) 16*d*, and a mark detector (not shown).

The feed roller 16*a* has a shaft around which a product group (sticker group) in the form of a sticker roll is wound and rotatably supported, and is a roller that is used to play out the sticker roll from this shaft and feed it toward the discharge port 26 while the sticker roll is held in the product storage unit 15.

The conveyance roller 16*b* conveys in the conveyance direction the sticker roll fed out by the feed roller 16*a*, and is driven by a conveyance motor (not shown).

As shown in FIG. 5, the conveyance roller 16*b* in this embodiment is provided downstream of the feed roller 16*a* in the front and rear direction.

The driven roller 16*c* rotates in conjunction with the rotational drive of the conveyance roller 16*b*. The driven roller 16*c* in this embodiment is disposed so as to be opposite the conveyance roller 16*b* with the sticker roll in between.

Accordingly, under the drive control of the conveyance control unit 112, the sticker roll is conveyed by rotating the driven roller 16*c* in conjunction with the rotational drive of the conveyance roller 16*b*, and the stickers in the randomly determined provision quantity (from among those on the sticker roll) are discharged one after the other from the discharge port 26 in a continuous state, and gradually move into the product presentation unit 17, proceed along an internal linear path (a path from the upper side to the lower side in the up and down direction) and head toward the dispensing port 27, while still in this continuous state.

The separation unit 16*d* is used to separate a portion of the sticker roll conveyed by the conveyance unit 16 from the sticker roll body. As shown in FIG. 5, the separation unit 16*d* in this embodiment comprises a cutter base 16*e* and a cutter 16*f*.

With the separation unit 16*d* in this embodiment, the cutter 16*f* is disposed opposite the cutter base 16*e*, a coil (not shown) is wound around the rear end of this cutter 16*f*, and when current is applied to this coil, the cutter 16*f* is attracted to a fixed magnet (not shown) and moves downward, and when the current through the coil is cut off, the cutter 16*f* moves upward due to the biasing force of a coil spring (not shown). Therefore, when the conveyance control unit 112 energizes the coil, the blade of the cutter 16*f* comes into contact with the stopped sticker roll, and the portion of the sticker roll that comes into contact with the blade of the cutter 16*f* is cut.

The mark detector is provided along the conveyance direction of the sticker roll, and detects a mark printed on the rear surface of the stickers when the sticker roll is conveyed in the conveyance direction by the conveyance unit 16. The conveyance control unit 112 counts the randomly determined provision quantity based on a detection signal from the mark detector, thereby adjusting the conveyance amount by which the sticker roll is to be discharged from the discharge port 26 (the length of a portion of the sticker roll), or adjusting the position at which it is cut off by the separation unit 16*d*. Also, if the mark detector cannot detect a mark while the stickers are being conveyed, the conveyance control unit 112 determines that an error has occurred (for instance, that the stickers have all been discharged, that the stickers have not been conveyed correctly, etc.).

Operation of Vending Machine 1

Figure 6:
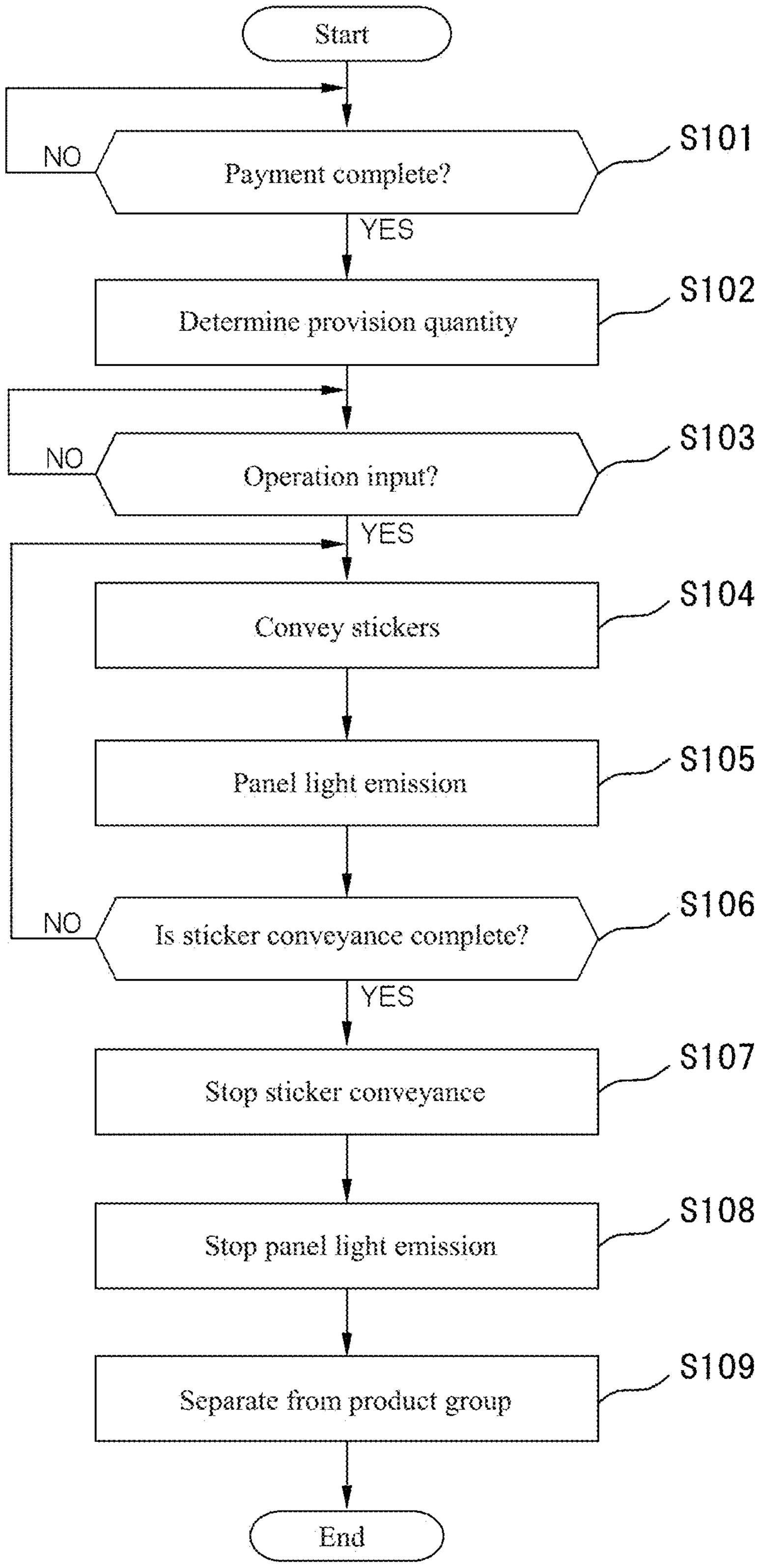
FIG. 6 is a flowchart illustrating the operation of the vending machine 1 according to this embodiment.

An example of the operation of the vending machine 1 according to this embodiment will be described with reference to FIG. 6. FIG. 6 is a flowchart illustrating the operation of the vending machine 1 according to this embodiment.

The control unit 11 determines whether or not a payment has been made by the user based on a detection signal from the coin detector of the payment detection unit 19 (step S101).

If no payment has been received (No in step S101), the processing waits until a payment is received. On the other hand, if a payment has been made (Yes in step S101), the processing proceeds to the next step S102.

Next, when the user makes a payment, the control unit 11 randomly determines the provision quantity (step S102).

More specifically, when the user makes a payment, the quantity determination unit 111 randomly determines the sticker provision quantity from within a specific range (a range from a specific lower limit number to a specific upper limit number).

For example, if the price for one play is set to "100 yen" and the range of the sticker provision quantity is set to "a range from a lower limit of 5 stickers to an upper limit of 15 stickers," the sticker provision quantity will be randomly determined from within a range of 5 to 15 stickers.

In order to make it less likely that the upper limit of 15 stickers will be determined, the probability of winning that quantity may be set to be lower than other sticker quantities. Also, the probability of winning may be set to decrease as the upper limit quantity is approached. Also, the average number of stickers to be discharged can be set for each amount of money that is inserted, and the actual number discharged can be averaged based on this preset average number of stickers.

Next, the control unit 11 determines whether or not the user has performed an operation input for purchasing a product, based on an operation signal from the operation unit 13 (step S103). That is, it is determined whether or not the user who has made a payment has pressed the operation button 13*a* to purchase a product.

If the user has not pressed the operation button 13*a* (No in step S103), the processing waits until the operation button 13*a* is pressed. On the other hand, if the user has pressed the operation button 13*a* (Yes in step S103), the processing proceeds to the next step S104.

Next, when the user has pressed the operation button 13*a* and that operation signal has been received, the control unit 11 controls the conveyance unit 16 to convey the sticker roll (product group) (step S104).

More specifically, the conveyance control unit 112 drives a conveyance motor (not shown) to rotate the conveyance roller 16*b*, and the driven roller 16*c* rotates in conjunction with the rotational drive of the conveyance roller 16*b*, which conveys the sticker roll (product group) in the conveyance direction. Here, the conveyance control unit 112 conveys the sticker roll (product group) based on the provision quantity determined by the processing in step 102 above. In other words, the conveyance control unit 112 adjusts the amount by which the sticker roll (product group) is conveyed (the length of a portion of the sticker roll) so that the stickers in the provision quantity determined by the processing in step 102 above are discharged from the discharge port 26, based on the detection signal from the mark detector of the conveyance unit 16.

Next, the control unit 11 performs control so that the light-emitting panel 17*a* of the product presentation unit 17 emits light along with the conveyance of the sticker roll (product group) (step S105).

More specifically, the light emission control unit 113 causes the plurality of light-emitting panels 17*a* arranged in the up and down direction in the product presentation unit 17 to emit light sequentially in accordance with the conveyance of the sticker roll (product group). Here, the light emission control unit 113 causes the light-emitting panels 17*a* to emit light starting with the one located at the top in the up and down direction, and moving down from there to match the movement of the stickers in the provision quantity determined by the processing in step 102 above from the discharge port 26 to the dispensing port 27 in the product presentation unit 17. That is, the light emission control unit 113 causes the light-emitting panels 17*a* to emit light sequentially to match the timing at which the stickers in the provision quantity determined by the processing in step 102 above are sequentially discharged in a continuous state from the discharge port 26, based on the detection signal from the mark detector of the conveyance unit 16.

Because of this, from the user's perspective, the movement of the stickers in the determined provision quantity in a continuous state, and the movement of light caused by the sequential emission by the light-emitting panels 17*a* appear as though they are linked, making it easier for the user to have a sense of an increase in quantity of stickers, and to have a sense of a large, continuous quantity.

Next, the control unit 11 determines whether or not the conveyance of the stickers in the provision quantity determined by the processing in step S102 above has been completed (step S106).

More specifically, the conveyance control unit 112 counts the stickers in the provision quantity determined by the processing in step 102 above based on a detection signal from the mark detector of the conveyance unit 16, and determines whether or not the count has reached the determined provision quantity, thereby determining whether or not the conveyance of the stickers has been completed.

In addition, the control unit 11 may perform control such that the display unit 14 displays the current count in real time while counting the stickers in the provision quantity determined by the processing in step 102 above.

If it is determined that the conveyance of the stickers in the determined provision quantity has not been completed (No in step S106), the processing in steps S104 and S105 is repeated. On the other hand, if it is determined that the conveyance of the stickers in the determined provision quantity has been completed (Yes in step S106), the processing proceeds to the next step S107.

Next, if the conveyance of the stickers in the provision quantity determined by the processing in step S102 has been completed, the control unit 11 causes the conveyance unit 16 to stop conveying the sticker roll (product group) (step S107).

More specifically, when the rotation of the conveyance roller 16*b* is stopped by stopping the conveyance motor (not shown), the conveyance control unit 112 stops the rotation of the driven roller 16*c* in conjunction with the stoppage of the rotation of the conveyance roller 16*b*, thereby stopping the conveyance of the sticker roll (product group).

In this way, when the conveyance of the sticker roll (product group) is stopped, the stickers in the determined provision quantity are exposed from the discharge port 26 while still in a continuous state in the product presentation unit 17 and are presented as the products to be provided to the user. Consequently, from the user's perspective, it is easier to have a sense of an increase in quantity of stickers, and to have a sense of a large, continuous quantity, without actually having the stickers in the determined provision quantity in hand.

Next, the control unit 11 stops the emission of light from the light-emitting panels 17*a* of the product presentation unit 17 in conjunction with the stoppage of conveyance of the sticker roll (product group) (step S108).

More specifically, the light emission control unit 113 either stops the emission of light from the light-emitting panels 17*a* in the product presentation unit 17 to match the stoppage of conveyance of the sticker roll (product group), or continues the emission for a while and then stops the emission of light from the light-emitting panels 17*a* after the stoppage of conveyance of the sticker roll (product group).

Next, the control unit 11 controls the separation unit 16*d* of the conveyance unit 16 so that the stickers in the provision quantity determined by the processing in step S102 above are separated from the sticker roll (product group) (step S109).

More specifically, the conveyance control unit 112 energizes a coil (not shown) at the rear end of the cutter 16*f*, causing the blade of the cutter 16*f* to come into contact with the stopped sticker roll, so the sticker roll is cut off at the location in contact with the blade of the cutter 16*f*, that is, stickers are cut in the provision quantity determined by the processing in step 102 above. The result of this is that the stickers in the determined provision quantity are separated from the sticker roll body. Consequently, the stickers in the determined provision quantity drop from the discharge port 26 along the path of the product presentation unit 17 and reach the dispensing port 27.

Once the stickers are thus separated from the sticker roll (product group), the user can remove the stickers in the provision quantity determined by the processing in step 102 above from the dispensing port 27 while the stickers are still in a continuous state.

As discussed above, with the vending machine 1 according to this embodiment, when the provision quantity is randomly determined, the product presentation unit 17 presents the stickers in the determined provision quantity in a continuous state as the products to be provided to the user. Therefore, the user can easily get a visual sense of an increase in quantity of stickers, and a visual sense of a large, continuous quantity, without actually having the stickers in the determined provision quantity in hand, which increases excitement for the user.

OTHER EMBODIMENTS

The above embodiments are intended to facilitate an understanding of the present invention and should not be interpreted as limiting the present invention. The present invention can be modified and improved without departing from the gist thereof, and the present invention also includes equivalents thereof. In particular, the embodiments described below are also included in the invention. That is, the present invention can be configured by suitably combining the above embodiment with the embodiments described below.

Also, various inventions can be configured by suitably combining a plurality of the defining features of the invention disclosed in the above embodiment. For example, an invention may be configured by deleting some of the defining features of the invention from all of the defining features of the invention disclosed in the above embodiment, or an invention may be configured by suitably combining the defining features of the invention disclosed in the embodiments described below with all of the defining features of the invention disclosed in the above embodiment.

Stickers

Figures 7A, 7B, 7C:
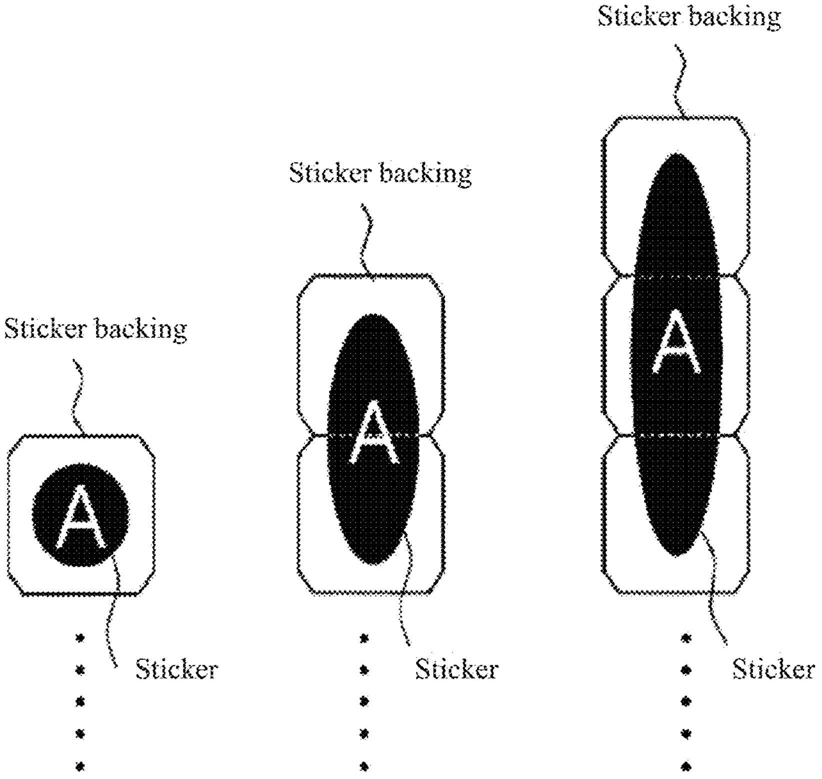
FIGS. 7A-7C are diagrams showing examples of various sticker arrangements according to this embodiment, where

In the above embodiment, an example was given in which one sticker was a product unit, but other examples of sticker arrangements will be given below with reference to FIGS. 7A-7C. FIGS. 7A-7C are diagrams showing examples of various sticker arrangements, where FIG. 7A is a diagram showing a sticker disposed in one section of a sticker backing, FIG. 7B is a diagram showing an example of a sticker disposed such that it spans multiple sections of a sticker backing, and FIG. 7C is a diagram showing another example of a sticker disposed such that it spans multiple sections of a sticker backing.

With the vending machine 1, as shown in FIG. 7A, a single sticker (product unit) is associated with one section of the sticker backing, and a plurality of stickers (product units) can be connected in a continuous state and the resulting sticker group (sticker roll) can be treated as a product group, but if a single sticker (product unit) is formed so that it spans multiple sections of the sticker backing, this can also be treated as a product group. In this case, the vending machine 1 may be provided with a product detector or sensor for detecting stickers (product units) disposed in one section or in multiple sections of the sticker backing.

For example, FIG. 7B shows a case in which one sticker (product unit) is associated with two sections of the sticker backing. Here again, a plurality of stickers (product units) can be connected in a continuous state and the resulting sticker group (sticker roll) can be treated as a product group. The conveyance control unit 112 considers that one sticker has been counted when two marks are detected by the mark detector of the conveyance unit 16, and adjusts the conveyance amount of the sticker roll (the length of a portion of the sticker roll).

FIG. 7C shows an example in which one sticker (product unit) is associated with three sections of the sticker backing. Here again, a plurality of stickers (product units) can be connected in a continuous state and the resulting sticker group (sticker roll) can be treated as a product group. The conveyance control unit 112 considers that one sticker has been counted when three marks are detected by the mark detector of the conveyance unit 16, and adjusts the conveyance amount of the sticker roll (the length of a portion of the sticker roll).

A sticker roll (sticker group) may be formed not only of stickers disposed in one section of the sticker backing, but may also be formed of stickers disposed such that they span multiple sections of the sticker backing.

Also, a sticker roll (sticker group) may be formed by mixing stickers disposed in one section of the sticker backing and stickers disposed such that they span multiple sections of the sticker backing. In this case, if it is determined in advance which stickers in the sticker roll span multiple sections, those stickers that span multiple sections can be distinguished from the remaining number of stickers during discharge. In determining the provision quantity of stickers (the number of stickers to be discharged), if stickers that span multiple sections can be distinguished from the remaining number, then the determination may be made within a range that excludes those stickers that span multiple sections. Consequently, a sticker that spans multiple sections will be conveyed a different distance than a sticker disposed in just one section, so an adjustment can be made to keep stickers from being cut midway. While this could result in more stickers being discharged than the determined provision quantity (the number of stickers to be discharged), it does give the user a sense of having obtained an unexpected windfall.

Also, since the mark detector detects a mark for each section of the sticker backing, stickers that span multiple sections may not be detected correctly, so there is a risk that stickers spanning multiple sections may be cut off midway. Accordingly, a mark may be printed only in the first of multiple sections of the sticker backing corresponding to stickers spanning multiple sections (that is, no marks are disposed in the second and subsequent sections), and stickers spanning multiple sections may be counted as one.

Also, in the above embodiment, the mark on the rear surface of the sticker may be an encrypted identification code (such as a QR Code®, etc.), and it may be determined whether or not an illegally copied sticker is being used by reading this mark. The mark on the rear surface of the sticker may be printed using stealth ink or the like so as to be invisible to the naked eye.

Provision Quantity

In the above embodiment, an example was given in which the quantity determination unit 111 randomly determined the sticker provision quantity from within a specific range (a range from a specific lower limit number to a specific upper limit number) each time a user makes a payment (each time a user uses the vending machine 1), but the present invention is not limited to this.

For example, the provision quantity may be determined according to how many products are remaining in the product group stored in the memory unit 12. More specifically, if the number of remaining stickers in a sticker roll (product group) falls below a specific upper limit in a range between a specific lower limit and a specific upper limit, the provision quantity may be determined according to this remaining number of stickers rather than being determined randomly. As a specific example, if the price for one play is set to "100 yen" and the range of the sticker provision quantity is set to "a range from a lower limit of 5 stickers to an upper limit of 15 stickers," then when the quantity determination unit 111 compares the total number of stickers in the sticker roll with the count of the number of stickers provided to the user so far, and determines that the remaining number of stickers in the sticker roll is below the "upper limit of 15 stickers," the provision quantity is determined to be the "lower limit of 5 stickers" rather than making a random determination. In this case, if the remaining number of stickers in the sticker roll is equal to or less than the "upper limit of 15 stickers," the number of stickers provided to the user for the next three times is determined to be the "lower limit of 5 stickers," so the entire sticker roll can be used up while still ensuring the minimum number of stickers. Alternatively, if it is determined that the remaining number of stickers in the sticker roll is equal to or less than the "upper limit of 15 stickers," the provision quantity may be determined to be the "upper limit of 15 stickers," rather than being determined randomly. In this case, if the remaining number of stickers in the sticker roll is equal to or less than the "upper limit of 15 stickers," the number of stickers provided to the user for the final play will be determined to be the "upper limit of 15 stickers," so the entire sticker roll can be used up while ensuring the maximum number of stickers. If it is determined that the number of remaining stickers in the sticker roll is equal to or less than the "upper limit of 15 stickers," an error message may be displayed on the display unit 14 indicating that the stickers are running low. When the seller sees this error message, they can open the door body 3 and replace the sticker roll in the product storage unit 15 inside the main body 2 with a new sticker roll.

Also, the system may be designed such that if the number of remaining stickers stored in memory unit 12 is less than the minimum number within the range of the provision quantity according to the price for one play, only a payment that falls within the range of the sticker provision quantity is accepted. For example, if there are 14 stickers remaining, and the price for one play is set to "100 yen," the provision quantity is determined to be in the range of 5 to 14 stickers, and if the price for one play is set to "200 yen," the provision quantity is determined to be in the range of 10 to 14 stickers, not 10 to 30 stickers. On the other hand, if the price for one play is set to "300 yen," this is less than 15 stickers, which is the minimum quantity in the range of the provision quantity, so once 200 yen has been inserted, control is performed so that no more coins will be accepted, and "200 yen" is set as the price for one play as an exception.

Also, for example, the provision quantity may be determined in advance rather than by lottery. More specifically, for example, if the price for one play is set to "100 yen" and the range of the sticker provision quantity is set to the "range of a lower limit of 5 stickers and an upper limit of 15 stickers," the provision quantity may be determined in advance to be 5 stickers for a first-time user, 6 stickers for a second-time user, and 7 stickers for a third-time user. Another method is for the provision quantity to be determined in advance so that it is the same quantity every time. More specifically, for example, if the price for one play is set to "100 yen," the provision quantity is determined to be "5 stickers" each time, and if the price for one play is set to "200 yen," the provision quantity is determined to be "10 stickers" each time.

Also, for example, control may be performed so that the average number of stickers to be discharged can be set in advance for each amount of money that is inserted, and the actual number of stickers discharged can be averaged based on this preset average number of stickers.

Also, in the above embodiment, an example was given in which the quantity determination unit 111 randomly determined the sticker provision quantity from within a specific range (a range from a specific lower limit number to a specific upper limit number) at the point when the user makes a payment, but the present invention is not limited to this.

For example, the sticker provision quantity may be determined randomly at the point when the user presses the operation button **13*a***.

Separation Unit

In the above embodiment, an example was given in which stickers in a provision quantity determined by the quantity determination unit 111 were separated from the sticker roll (product group) by the separation unit **16*d***, but the present invention is not limited to this.

For example, the vending machine 1 may be configured not to have the separation unit **16*d***, or may be configured to have a separation unit with a fixed blade that does not move up and down, which allows the user himself to pull off the stickers in the determined provision quantity from the sticker roll body.

Path within Product Presentation Area

In the above embodiment, as shown in FIG. 5, an example was given in which stickers in the provision quantity determined by the quantity determination unit 111 moved while still in a continuous state along a straight path within the product presentation unit 17, but the present invention is not limited to this.

For example, the path within the product presentation unit 17 may be a straight path in the up and down direction, a straight path in the left and right direction, a straight path in the front and rear direction, a curved path, a spiral path, etc., or any combination of these.

Printing Unit

In the above embodiment, an example was given in which stickers with preprinted designs were used, but the present invention is not limited to this.

For example, the vending machine 1 may be configured to include a printing unit (printer). In this case, after the stickers have been printed with design data stored in the memory unit 12, the stickers printed with these designs may be conveyed by the conveyance unit 16 and provided to the user.

Product Group

In the above embodiment, an example was given in which a sticker roll (product group) was arranged so that adjacent stickers that were connected to each other had different designs, but the present invention is not limited to this, and some of the adjacent stickers that are connected to each other may have the same type of design.

Also, in the above embodiment, in the sticker roll (product group), a plurality of connected stickers may be arranged so that stickers of a rare type are included in addition to stickers of a normal type. With this configuration, although the number of stickers of a rare type included in the sticker roll is small, there is a possibility that a rare type of sticker will be included among the stickers in the provision quantity determined by the quantity determination unit 111, and this heightens the user's sense of anticipation.

In the above embodiment, an example was given in which a sticker group (sticker roll) in which a plurality of stickers were connected in a continuous state was used as an example of a product group in which a plurality of product units are connected in a continuous state, but the present invention is not limited to this.

For example, a single piece of printed material (such as a card) may be treated as a product unit and a plurality of these printed materials may be connected together in a continuous state, or a single package of individually wrapped food products (such as candy, gum, snacks, etc.) may be treated as a product unit and a plurality of these packages may be connected together in a continuous state.

Also, in the above embodiment, a product unit that can be defined by a unit length or unit weight may be treated as a product unit, and a collection of a plurality of product units may be treated as a product group.

For example, a strip of food (such as a stick of chewing gum) or a strip of ornamental material (such as a ribbon) may be treated as a product group and the unit length thereof (such as 5 cm) may be treated as a product unit. In this case, a transparent polyethylene bag or the like may be placed in the product presentation unit 17, and food products, etc., in the provision quantity determined by the quantity determination unit 111 are discharged into the bag in a continuous state from a roll-shaped food product group.

Also, for example, a large amount of liquid (such as drinking water) may be treated as a product group, and the unit weight thereof (such as 100 mL) may be treated as a product unit. In this case, a transparent polyethylene bag or the like may be placed inside the product presentation unit 17, and a liquid in the provision quantity determined by the quantity determination unit 111 is discharged from a liquid tank (product group) into the bag.

In the above embodiment, an example was given in which a product group formed by winding in a roll shape (such as a sticker roll) as an example of a product group in which a plurality of product units are connected in a continuous state, but a product group formed by folding in multiple stages (such as a folded sticker group) may be used instead.

REFERENCE SIGNS LIST

1 Vending machine, 2 Main body, 3 Door body, *3a* Transparent part, 11 Control unit, 12 Memory unit, 13 Operation unit, *13a* Operation button, 14 Display unit, 15 Product storage unit, 16 Conveyance unit, *16a* Feed roller, *16b* Conveyance roller, *16c* Driven roller, *16d* Separation unit, *16e* Cutter base, *16f* Cutter, 17 Product presentation unit, *17a* Light-emitting panel, 18 Audio output unit, 19 Payment detection unit, *19a* Coin insertion slot, *19b* Return lever, *19c* Return slot, 20 Setting unit, 25 Product sample presentation unit, 26 Discharge port, 27 Dispensing port, 111 Quantity determination unit, 112 Conveyance control unit, 113 Light emission control unit

What is claimed is:

1. A product provision device comprising:
- a discharge port that discharges products;
- a dispensing port from which a user takes the products discharged from the discharge port;
- a central processing unit (CPU) that determines a provision quantity of the products;
- a conveyor that comprises a roller and conveys, among a plurality of product units connected in a continuous state in a product group, a product unit of the provision quantity such that the product unit of the provision quantity is discharged from the discharge port in a continuous state; and
- a product presentation guide that:
  - is disposed along a path from the discharge port to the dispensing port, and
  - presents, as a product to be provided to the user, the product unit of the provision quantity discharged from the discharge port in the continuous state.

2. The product provision device according to claim 1, further comprising:
- a separator that separates, from the product group, the product unit of the provision quantity that has been presented as the product to be provided to the user.

3. The product provision device according to claim 1, wherein
- the product presentation guide comprises:
  - a light-emitting panel that emits light to the product unit of the provision quantity that has been presented as the product to be provided to the user.

4. The product provision device according to claim 3, wherein
- the CPU controls the light-emitting panel to emit light in matching with movement of the product unit of the provision quantity that is sequentially discharged in the continuous state from the discharge port toward the dispensing port.

5. The product provision device according to claim 1, wherein
- the CPU determines the provision quantity according to how many of the product units included in the product group still remain.

6. The product provision device according to claim 1, wherein the product group includes a first product unit disposed corresponding to one section of the product group and a second product unit disposed corresponding to a plurality of sections of the product group, the first and second product units connecting to each other in a continuous state, the product provision device further comprises:

a product detector that detects the first product unit or the second product unit, and in response to the product detector detecting the second product unit, the conveyor conveys the product unit of the provision quantity by a conveyance amount different from a conveyance amount in a case of detecting the first product unit.

7. The product provision device according to claim 1, wherein the CPU randomly determines the provision quantity before receiving a user operation to request a product, and the conveyor conveys the product unit of the provision quantity after receiving the user operation.

* * * * *